(12) United States Patent
Kim et al.

(10) Patent No.: US 11,704,757 B2
(45) Date of Patent: Jul. 18, 2023

(54) SERVER AND METHOD FOR DISPLAYING ADDITIONAL INFORMATION ON 3D TOUR

(71) Applicant: 3I INC., Daegu (KR)

(72) Inventors: Ken Kim, Seoul (KR); Ji Wuck Jung, Goyang-si (KR)

(73) Assignee: 3I INC., Daegu (KR)

( * ) Notice: Subject to any disclaimer, the term of this patent is extended or adjusted under 35 U.S.C. 154(b) by 0 days.

(21) Appl. No.: 17/459,635

(22) Filed: Aug. 27, 2021

(65) Prior Publication Data

US 2021/0390640 A1  Dec. 16, 2021

Related U.S. Application Data

(63) Continuation of application No. 17/084,338, filed on Oct. 29, 2020.

(30) Foreign Application Priority Data

Oct. 29, 2019 (KR) .......................... 10-2019-0135429
Oct. 29, 2019 (KR) .......................... 10-2019-0135475

(51) Int. Cl.
  *G06Q 50/16* (2012.01)
  *G06F 3/04817* (2022.01)
  *G06T 17/05* (2011.01)
  *G06T 19/00* (2011.01)

(52) U.S. Cl.
  CPC .......... *G06Q 50/16* (2013.01); *G06F 3/04817* (2013.01); *G06T 17/05* (2013.01); *G06T 19/003* (2013.01); *G06T 2219/028* (2013.01)

(58) Field of Classification Search
  CPC .............................................. G06T 2219/028
  See application file for complete search history.

(56) References Cited

U.S. PATENT DOCUMENTS 6,580,441 B2 * 6/2003 Schileru-Key ..... G06Q 30/0641
                                                      715/854
2018/0143756 A1 * 5/2018 Mildrew ............... G06F 3/0482

FOREIGN PATENT DOCUMENTS

KR  10-2016-0124479 A  10/2016
KR    10-1794931 B1    11/2017

OTHER PUBLICATIONS

Office Action dated Sep. 16, 2020 in Korean Application No. 10-2019-0135429.

(Continued)

*Primary Examiner* — Cesar B Paula
*Assistant Examiner* — Sajeda Muhebbullah
(74) *Attorney, Agent, or Firm* — JCIPRNET

(57) ABSTRACT

The described technology is a technique related to a server and method for displaying additional information on a 3D tour. In this case, the method for displaying additional information on a 3D tour performed by a server for providing a 3D tour service linked to a user terminal, the method includes providing a 3D tour comprising 3D information of a particular space to the user terminal, receiving coordinate information for a start point and an end point of an additional-information signpost to be created newly on the 3D tour displayed on the user terminal, creating an additional-information signpost connecting the start point and the end point, and overlappingly displaying the created additional-information signpost on the 3D tour.

14 Claims, 12 Drawing Sheets

(9 of 12 Drawing Sheet(s) Filed in Color)

(56) References Cited

OTHER PUBLICATIONS

Office Action dated Sep. 16, 2020 in Korean Application No. 10-2019-0135475.
Notice of Allowance dated Mar. 22, 2021 in Korean Application No. 10-2019-0135429.
Notice of Allowance dated Mar. 24, 2021 in Korean Application No. 10-2019-0135475.

* cited by examiner

SERVER AND METHOD FOR DISPLAYING ADDITIONAL INFORMATION ON 3D TOUR

CROSS-REFERENCE TO RELATED APPLICATION

This application is a continuation of U.S. patent application Ser. No. 17/084,338 filed on Oct. 29, 2020, which claims priority to Korean Patent Application No. 10-2019-0135429 filed on Oct. 29, 2019 and Korean Patent Application No. 10-2019-0135475 filed on Oct. 29, 2019 in the Korean Intellectual Property Office, and all the benefits accruing therefrom under 35 U.S.C. 119, the contents of each of which in their entirety are herein incorporated by reference.

BACKGROUND

Field

The described technology relates to a server and method for displaying additional information on a 3D tour. As an example, the described technology relates to a server and method for providing an interface capable of expressing additional information in a 3D form on a 360-degree 3D tour configured in three-dimension (3D). As an example, the described technology relates to a server and method for providing an interface capable of tagging and displaying additional information by linking 2D and 3D screens.

This work was supported by Institute of Information & communications Technology Planning & Evaluation (IITP) grant funded by the Korea government (MSIT) (No. 2017-0-00486, Video Enhancement and Transcoder based on the Space Geometry of 360 VR Contents).

Description of the Related Technology

The best way to record a 3D space is to capture a 360-degree omnidirectional view for a particular point and save it as a panoramic image, and combine panoramic images for a plurality of points to create a single 3D tour form.

Here, a 3D tour may consist of a combination of panoramic images (e.g., 360-degree images) that are captured at 360 degrees respectively at a plurality of points and then stored. In this case, the 3D tour may include location information in which each image is captured, and each location information may be mapped onto a floor plan and provided to a user.

In this case, there exists a need for users who use 3D tours to include and express additional information such as notes, images, videos, and so on onto the 3D tours.

However, existing interfaces for displaying additional information provided only the function of displaying additional information such as notes, images, or the like recorded by users in 2D on a floor plan. In this case, since the additional information was displayed only on the floor plan, there was a problem that it was difficult for a user to clearly display, in the space of the 3D tour, the additional information for a particular location where the user intended to put a note.

Furthermore, since the location was not clearly represented, there also was a problem that it was difficult for other people to clearly grasp the meaning of the additional information added.

Moreover, in the case of existing interfaces for displaying additional information, recorded additional information could be recognized only at a particular location, and thus, if the viewing angle for an image in a 3D tour was changed, there was a problem that the set additional information could not be checked.

As an example, for existing interfaces for recording additional information, since a 3D photographing interface and an interface for inputting additional information were separate, there was an inconvenience that a user had to separately input additional information onto a floor plan after photographing a 3D tour.

Further, for existing interfaces for recording additional information, since information inputted on a floor plan is not linked to a 3D tour, there was an inconvenience that a user had to separately input a location, corresponding to the additional information inputted on the floor plan, onto the 3D tour or check it separately.

As an example, there was a problem that it was difficult for other people to clearly grasp the meaning of the additional information displayed on a floor plan.

SUMMARY

It is an object of the described technology to provide a server and method for displaying additional information on a 3D tour that display relevant additional information at a particular point specified by a user in a 3D form, for various types of additional information that the user wants to record while using 3D tours.

Further, it is another object of the described technology to provide a server and method for displaying additional information on a 3D tour that allow a user to check set additional information at a desired location, by specifying 360-degree images, on which the additional information is displayed, by the user.

Furthermore, it is yet another object of the described technology to provide a server and method for displaying additional information on a 3D tour that enable the location of an additional-information signpost to be checked at a glance by displaying the locations of pieces of additional information added to a 3D tour together on a floor plan.

Moreover, it is still another object of the described technology to provide a server and method for displaying additional information on a 3D tour capable of simultaneously performing tasks of 3D photographing for a space and of inserting various types of additional information into a floor plan when photographing for 3D tour creation.

As an example, it is a further object of the described technology to provide a server and method for displaying additional information on a 3D tour that allow the location of the additional information to be calculated automatically and the additional information to be automatically displayed at a corresponding location on a second screen (e.g., a 3D tour screen) if the additional information is inserted at a particular location on a first screen (e.g., a 2D floor plan).

The objects of the described technology are not limited to those mentioned above, and other objects and advantages of the described technology that have not been mentioned can be understood by the following description, and will be more clearly understood by embodiments of the described technology. As an example, it will be readily understood that the objects and advantages of the described technology can be realized by the means and combinations thereof set forth in the claims.

One aspect is a method for displaying additional information on a 3D tour performed by a server for displaying additional information on a 3D tour operating in conjunction with a user device, the method comprising: providing a 3D tour comprising 3D information of a particular space to the user device, receiving coordinate information for at least one particular point selected by a user within the 3D tour, setting a start point and an end point of an additional-information signpost by using the coordinate information, and creating the additional-information signpost within a space of the 3D tour, based on the set start point and end point.

In the above method, further comprising: overlappingly displaying the created additional-information signpost on the 3D tour.

In the above method, wherein the coordinate information for the at least one particular point comprises first coordinate information for a first particular point and second coordinate information for a second particular point different from the first particular point, and wherein the setting a start point and an end point of an additional-information signpost by using the coordinate information comprises: setting the first coordinate information as the start point and setting the second coordinate information as the end point.

In the above method, wherein the coordinate information for the at least one particular point comprises first coordinate information for a first particular point, and wherein the setting a start point and an end point of an additional-information signpost by using the coordinate information comprises: setting the first coordinate information as the end point, and setting a point on a floor surface located at the shortest distance from the end point as the start point.

In the above method, wherein the coordinate information for the at least one particular point comprises first coordinate information for a first particular point, and wherein the setting a start point and an end point of an additional-information signpost by using the coordinate information comprises: setting the first coordinate information as the end point, and setting a point on a wall surface located at the shortest distance from the end point as the start point.

In the above method, wherein the additional-information signpost is set as three-dimensional coordinates on the 3D tour and displayed in 3D form.

In the above method, wherein the 3D tour comprises a floor plan of the particular space, the method further comprising: converting the three-dimensional coordinates of the created additional-information signpost into two-dimensional coordinates, and displaying an additional-information icon for the additional-information signpost, at a point on the floor plan corresponding to the two-dimensional coordinates.

In the above method, further comprising: providing an interface for setting additional information configured to set at least one photographing point on which the additional-information signpost is displayed out of a plurality of image photographing points included in the 3D tour.

In the above method, further comprising: providing the user device with an interface for setting additional information configured to set at least one of a color, title, description, or additional information of the additional-information signpost, wherein the additional-information signpost is created based on at least one of the color, title, description, or additional information inputted via the interface.

In the above method, wherein the additional information is displayed on one side of the additional-information signpost.

In the above method, wherein the additional information is displayed via a separate message window if the user selects the additional-information signpost.

In the above method, wherein the additional information comprises at least one of a photo, a video, and a URL link.

Another aspect is a server for displaying additional information on a 3D tour, the server comprising: a processor, and a memory having stored thereon a program executed by the processor, the program comprising: an operation of providing a 3D tour comprising 3D information of a particular space to the user device, an operation of receiving coordinate information for at least one particular point selected by a user within the 3D tour, an operation of setting a start point and an end point of an additional-information signpost by using the coordinate information, and an operation of creating the additional-information signpost within a space of the 3D tour, based on the set start point and end point.

In the above server, wherein the program further comprises an operation of overlappingly displaying the created additional-information signpost on the 3D tour.

The server and method for displaying additional information on a 3D tour in accordance with the described technology enable a user to set an additional-information signpost in a 3D form at a desired location, thereby displaying the additional information at an exact location intended by the user. This makes it possible to convey a clear explanation and meaning of a particular point to other users who use the same 3D tour.

As an example, the server and method for displaying additional information on a 3D tour in accordance with the described technology make it possible to check corresponding additional information at various locations in a 3D tour by providing an interface for selecting a particular 360-degree image on which a 3D additional-information signpost is intended to be displayed and by displaying the corresponding 3D additional-information signpost only on the selected image. As a result, the convenience for users can be improved, and the intention of displaying the additional information can be clearly conveyed to a plurality of users.

Further, the server and method for displaying additional information on a 3D tour in accordance with the described technology can provide a user with an intuitive interface that allows the user to grasp the location of inserted additional information at a glance by automatically displaying the location where the additional information is displayed on a floor plan in a 3D tour.

Moreover, the server and method for displaying additional information on a 3D tour in accordance with the described technology can reduce the inconvenience that a user has to perform a separate task of inserting the additional information after a 3D tour photographing by enabling the 3D tour photographing and the insertion of the additional information into a floor plan, at the same time.

As an example, the server and method for displaying additional information on a 3D tour in accordance with the described technology can improve the convenience for users by automatically displaying the additional information inserted onto a floor plan in the form of an additional-information signpost at a corresponding location in a 3D tour.

Furthermore, the server and method for displaying additional information on a 3D tour in accordance with the described technology can clearly convey the meaning of the additional information in question to other users who use the same 3D tour.

The effects of the described technology are not limited to those described above, and those skilled in the art of the described technology can readily derive various effects of the described technology from the configurations of the described technology.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
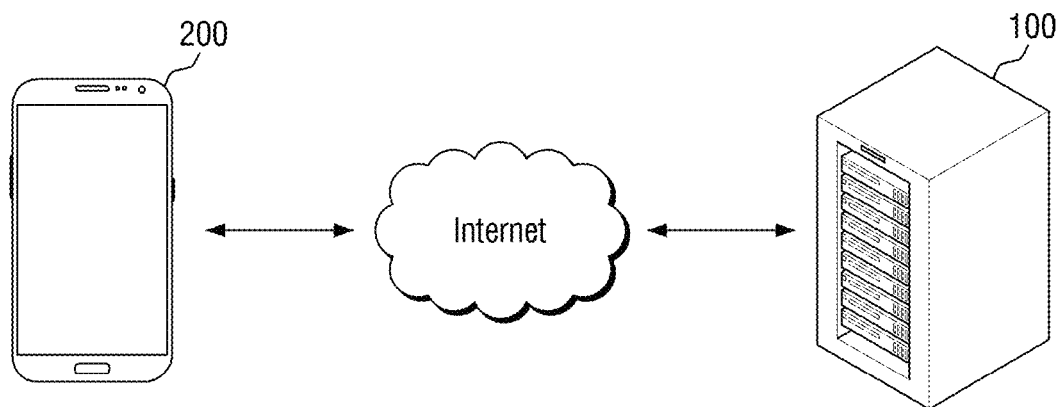
FIGS. 1 and 2 are block diagrams for illustrating a schematic configuration of a system for displaying additional information on a 3D tour in accordance with some embodiments of the described technology.

The advantages and features of the described technology and methods of achieving them will be apparent when reference is made to the embodiments described in detail below in conjunction with the accompanying drawings. However, the described technology is not limited to the embodiments disclosed below but will be implemented in a variety of different forms, the present embodiments merely make the disclosure of the described technology complete and are provided to fully convey the scope of the inventive concept to those having ordinary skill in the art to which the described technology pertains, and the described technology is defined only by the scope of the claims. Like reference numerals refer to like components throughout the specification.

The terms used herein are for describing embodiments and are not intended to limit the described technology. Herein, singular forms also include plural forms unless specifically stated in the context. As used herein, "comprises" and/or "comprising" means that the components, steps, operations, and/or elements mentioned do not preclude the presence or addition of one or more other components, steps, operations and/or elements.

Unless otherwise defined, all terms (including technical and scientific terms) used herein will be used in the sense that can be commonly understood by those of ordinary skill in the art to which the described technology pertains. Further, terms defined in commonly used dictionaries are not to be interpreted ideally or excessively unless explicitly defined specifically.

In the described technology, a '3D tour' may consist of a combination of a plurality of images (e.g., panoramic images) that are captured at 360 degrees respectively at a plurality of points and then stored. In this case, the '3D tour' may include location information in which each image is captured, and each location information may be mapped onto a floor plan and provided to users.

Hereinafter, a server and method for displaying additional information on a 3D tour in accordance with an embodiment of the described technology will be described in detail with reference to the drawings.

Figure 2:
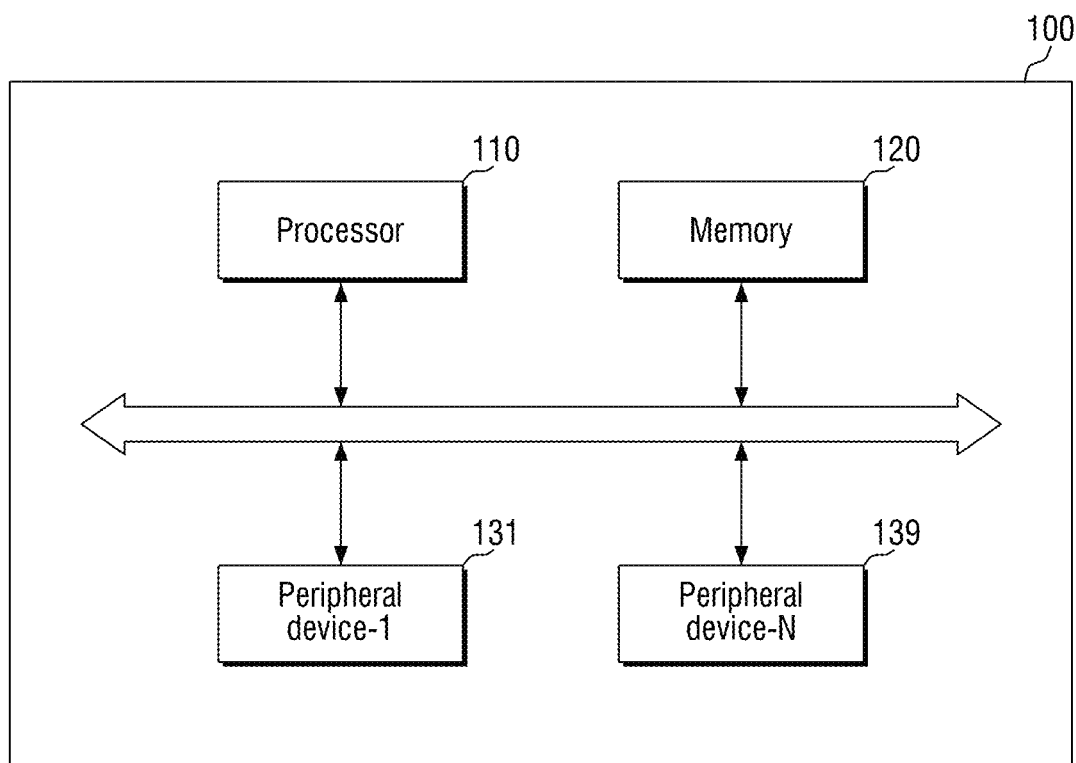

FIGS. 1 and 2 are block diagrams for illustrating a schematic configuration of a system for displaying additional information on a 3D tour in accordance with some embodiments of the described technology.

Referring to FIG. 1, a system for displaying additional information on a 3D tour in accordance with an embodiment of the described technology comprises a server 100 for displaying additional information on a 3D tour (hereinafter, referred to as a server) and a user device 200. The server 100 and the user device 200 may be implemented as a server-client system.

In this case, the server 100 may select an image corresponding to a particular point selected by a user out of a plurality of image photographing points included in a 3D tour and provide it to the user device 200. The server 100 may transmit and receive data to and from the user device 200 via a wired or wireless network.

Although only one user device 200 is illustrated in FIG. 1, the described technology is not limited thereto, and the server 100 may operate in conjunction with a plurality of user devices 200.

The server 100 may store and manage a plurality of different 3D tours. In this case, the server 100 may receive a coordinate value for creating an additional-information signpost from the user device 200, and may display additional information using the additional-information signpost on the 3D tour, using the coordinate value received. A detailed description of a method for displaying additional information on a 3D tour will be described later.

Also, the server 100 may insert the additional information at particular points selected by the user, and display icons for the additional information on a floor plan and a 3D tour in the user device 200. The server 100 may transmit and receive data to and from the user device 200 via a wired or wireless network.

The server 100 may store and manage captured 360-degree images, a floor plan for a 3D tour, a 3D additional-information signpost, and an additional-information display icon, via the user device 200.

Thereafter, the server 100 may provide the 360-degree images, the 3D tour, the 3D tour floor plan, the 3D additional-information signpost, and the additional-information display icon to the user device 200.

The server 100 may display the 3D tour and the additional information inserted into the floor plan of the 3D tour simultaneously on the screen of the user device 200. At this time, a process of photographing a 3D tour may be displayed on one side of the screen of the user device 200, and the floor plan of the 3D tour may be displayed on the other side.

As an example, the server 100 may input and display the additional information on the floor plan of the 3D tour, and at the same time, may also input and display the additional information of the same description on the 3D tour.

As an example, the server 100 may automatically create and display additional-information signposts at corresponding locations in the 3D tour, based on the location coordinates of the additional information inputted through the floor plan during the 3D tour photographing.

In other words, the server 100 may display additional-information icons at the locations where the additional information was inputted on the floor plan, and display 3D additional-information signposts at the corresponding locations in the 3D tour. A detailed description of a method for inputting and displaying the additional information on the floor plan, and inserting and displaying that additional information in the 3D tour will be described in detail below. Hereinafter, the configuration of the server 100 will be described in detail.

On the other hand, referring to FIG. 2, the server 100 comprises a memory 120 having stored thereon a program for implementing the technical idea of the described technology, and a processor 110 for executing the program stored in the memory 120.

In this case, the data related to the 3D tour and the additional information on the 3D tour may be stored in the memory 120. For example, the 3D tour may comprise 360-degree photographed images, coordinates of the photographing locations for the photographed images, data on the floor plan to which corresponding coordinates are mapped, data on the additional-information signposts added into the 3D tour, and data on the setting of the additional information.

Here, the data on the additional-information signpost may include the description of the additional information, the color of the additional-information signposts, the coordinates of the additional-information signposts, the location in the floor plan to which the corresponding coordinates are mapped, and so on. As an example, the data on the setting of the additional information may include data on the description of the additional information, the icons for representing the additional information, the coordinates of the additional-information signposts, and the floor plan to which the corresponding coordinates are mapped.

An algorithm for the method for displaying additional information on a 3D tour may be stored in the memory 120. Here, the method for displaying additional information on a 3D tour refers to a method of providing an interface for setting additional information in a 3D form on the 3D tour configured in 3D. In this case, the processor 110 may be the execution subject for the corresponding algorithm.

As an example, the server 100 may provide the interface for setting 3D additional information through which the user can create the additional-information signposts in a 3D form on the 3D tour.

At this time, the server 100 may receive coordinate values for the start point and end point of the additional-information signpost and create the additional-information signpost, and map the additional information inputted by the user to the additional-information signpost created.

Further, the server 100 may provide an interface for displaying the inputted additional information only at a particular location by allowing the user to specify an image photographing point where the additional-information signpost is to be displayed.

Moreover, the server 100 may display the location of the additional information set in the 3D tour together on the floor plan. A detailed description thereof will be set forth below with reference to the drawings.

Additionally, the processor 110 may be referred to as different names such as a CPU or a mobile processor, depending on the implementations of the server 100.

The memory 120 may be implemented in any form of storage device that can store a program and can be accessed by the processor to run the program. Depending on hardware implementations, the memory 120 may be implemented in a plurality of storage devices instead of one storage device. Further, the memory 120 may comprise not only a main storage device but also a temporary storage device. As an example, the memory 120 may also be implemented in a volatile memory or a nonvolatile memory, and may be defined in the sense of including all forms of information storage means implemented so that a program can be stored and run by a processor.

Moreover, the server 100 may be implemented in various ways such as a web server, a computer, a mobile phone, a tablet, a TV, and a set-top box, depending on the embodiments, and may be defined in the sense of including any forms of data processing device capable of performing the functions defined herein.

The server 100 may further comprise various peripheral devices (e.g., peripheral device-1 131 to peripheral device-N 139) depending on embodiments. For example, the server 100 may further comprise peripheral devices such as a 360-degree camera, a keyboard, a monitor, a graphics card, and a communication device.

Hereinafter, a method for displaying additional information on a 3D tour performed by the server will be described in detail.

Figure 3:
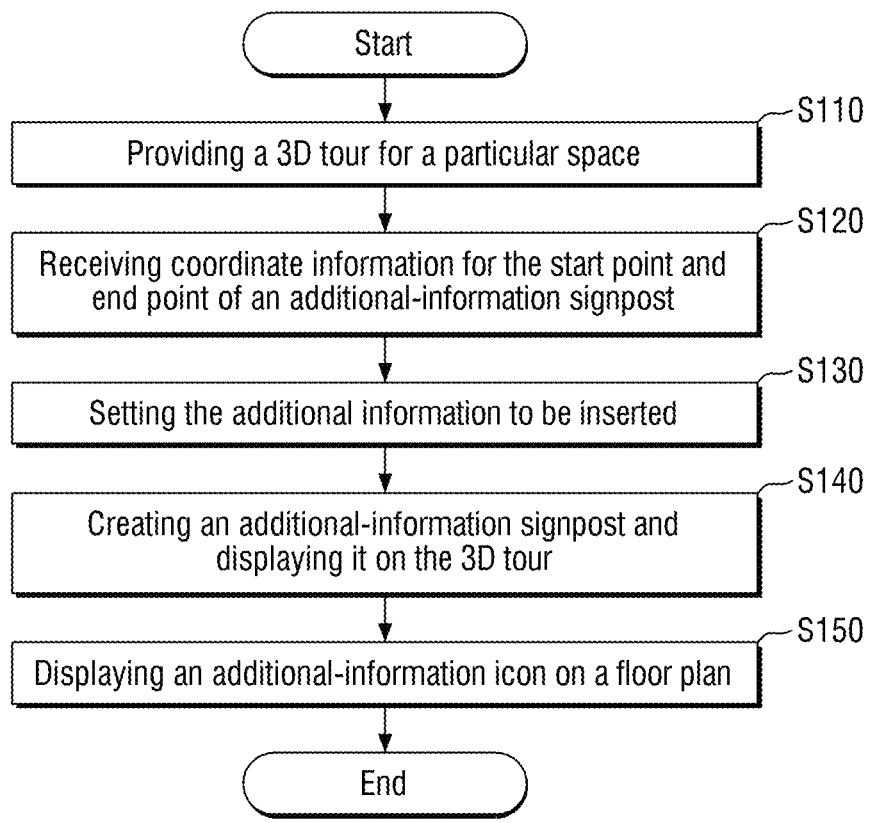
FIG. 3 is a flowchart for illustrating a method of adding and displaying additional information in a 3D tour in accordance with an embodiment of the described technology.

FIG. 3 is a flowchart for illustrating a method of adding and displaying additional information in a 3D tour in accordance with an embodiment of the described technology.

Referring to FIG. 3, in the method for displaying additional information on a 3D tour for displaying the additional information in 3D in the 3D tour in accordance with an embodiment of the described technology, first, a server 100 provides a 3D tour for a particular space to a user device 200 (S110).

The server 100 receives coordinate information for the start point and end point of an additional-information signpost (S120). In this case, the user may specify a particular point on the 3D tour displayed on the user device 200 as the start point or the end point.

For example, the server 100 may provide a menu capable of adding the additional information through a mouse click or a touch input in the 3D tour. The user may input the start point and end point of the additional-information signpost by selecting the menu for adding the additional information.

In this case, the menu for adding the additional information may be provided through various modifications, such as being replaced with a button for adding additional information in the tool list window.

As an example, the start point and end point of the additional-information signpost may be derived from a line connecting two points on the 3D tour received from the user device 200 by the server 100. In this case, one end of the line inputted from the user may be set as the start point, and the other end of the line may be set as the end point.

On the other hand, if only one point is inputted from the user device 200, the server 100 may set the inputted point as the end point, and set a point on a floor or wall surface located at the shortest distance from the inputted point as the start point.

In this case, the coordinate information of the start point and end point of the additional-information signpost may be stored in the form of three-dimensional spatial coordinates.

Further, the end point of the additional-information signpost may be displayed in various shapes in the 3D tour. For example, the end point of the additional-information signpost may comprise diverse variations such as a circle, a triangle, a square, and the like.

Thereafter, the user sets the additional information to be inserted, via the interface for setting additional information (S130). At this time, the user may set the color, title, description, and the like of the additional-information signpost via the interface for setting additional information, and insert various types of additional information (e.g., photos, videos, URLs, etc.). In this case, a pop-up window for setting additional information may appear automatically after the start point and end point of the additional-information signpost have been specified, or may appear when the additional-information signpost created is clicked. However, this is only one example, and the described technology is not limited thereto.

The server 100 creates an additional-information signpost using the coordinate values of the start point and the end point, and displays the created additional-information signpost on the 3D tour (S140). At this time, the start point and end point inputted may be connected to each other, and may be represented as an additional-information signpost in a 3D form on the 3D tour. Also, the additional information set on the corresponding additional-information signpost may be separately displayed near that additional-information signpost.

Thereafter, the server 100 displays an additional-information icon on a floor plan corresponding to the location to which the additional-information signpost has been added on the 3D tour (S150). In this case, the server 100 may display the additional-information icon for the additional-information signpost added into the floor plan by converting the 3D coordinates of the added additional-information signpost into 2D coordinates. The additional-information icon may be displayed in different icons (e.g., a photo icon or a video icon) depending on the type of additional information.

Hereinafter, the interface for setting additional information provided by the server will be described in detail.

Figure 4:
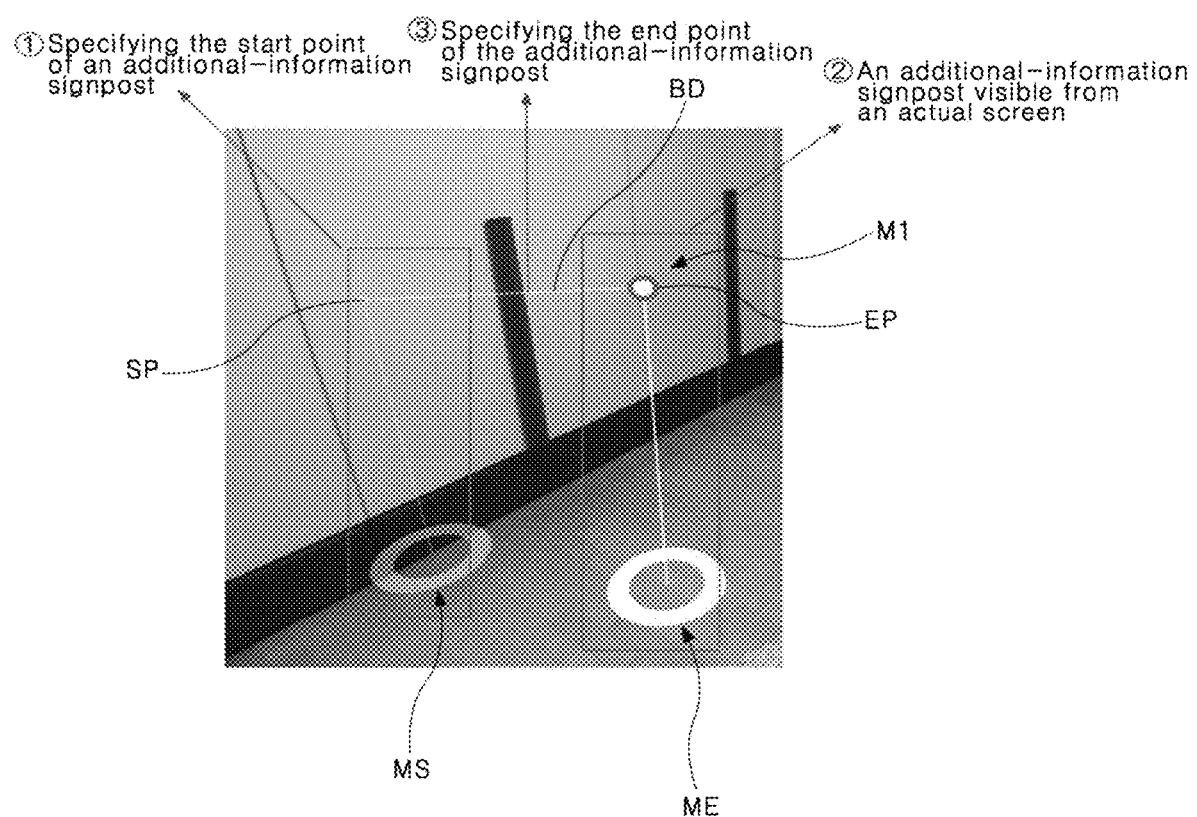
FIGS. 4 and 5 are views for illustrating an interface for setting additional information, provided by a system for displaying additional information on a 3D tour in accordance with an embodiment of the described technology.
Figure 5:
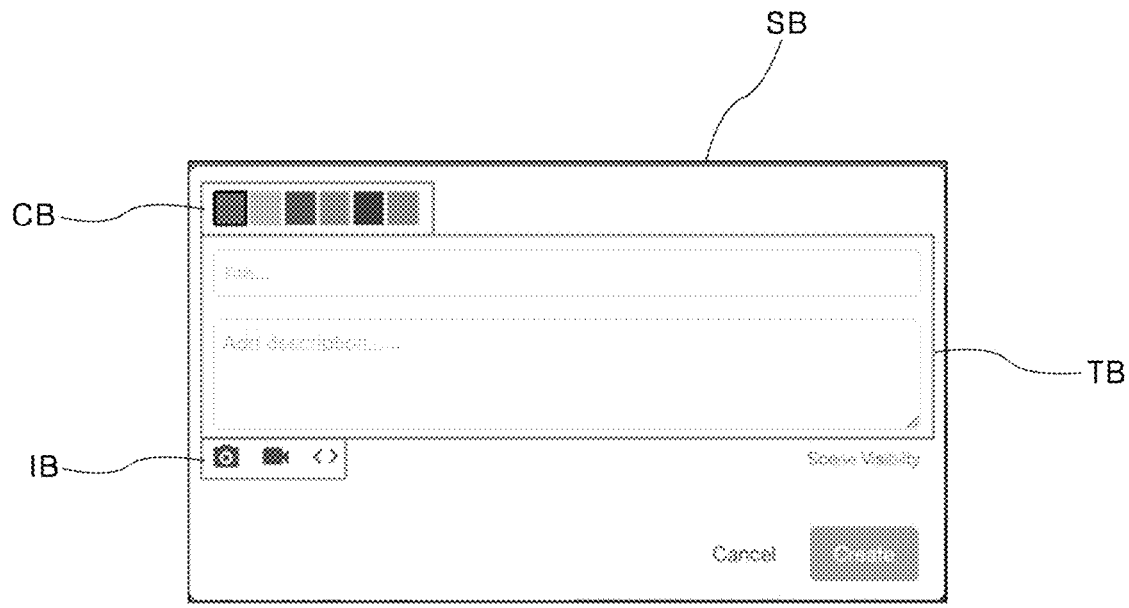

FIGS. 4 and 5 are views for illustrating an interface for setting additional information, provided by a system for displaying additional information on a 3D tour in accordance with an embodiment of the described technology.

Referring to FIG. 4, a user may set a start point SP and an end point EP via an interface for setting additional information.

For example, once the user selects a particular location in the 3D tour, the start point SP of an additional-information signpost may be set in the 3D tour.

When the user selects another particular location, the end point EP of the additional-information signpost is set in the 3D tour. At this time, the start point SP and the ending point EP of the additional-information signpost M1 may be stored in the server 100 in the form of 3D coordinates.

When the start point SP and the end point EP of the additional-information signpost are set, a body part BD connecting the two points is created, and as a result, the additional-information signpost M1 may be displayed on the 3D tour in a 3D form.

A first mark MS is displayed on a floor surface corresponding to the start point SP of the additional-information signpost M1 created, and a second mark ME may be displayed on the floor surface corresponding to the end point EP. The first mark MS and the second mark ME are additional representations for clarifying the location of the additional-information signpost on the 3D tour, and may be omitted according to predetermined set values.

However, the method of inputting the start point SP and the end point EP described above is just one example, and the selection of the start point SP and the end point EP may be set through various modifications such as a mouse click or drag, input through continuous touch, input via the menu for adding additional information, and so on.

Referring to FIG. 5, after the user sets the start point SP and the end point EP, a pop-up SB for setting additional information may be executed. However, this is just one example of a method of displaying the pop-up SB for setting additional information setting, and the pop-up SB for setting additional information may be modified and implemented in various ways, such as displaying through the right-clicking of a mouse, or appearing when clicking on the additional-information signpost, or the like.

The pop-up SB for setting additional information may comprise a signpost color box CB, a text input box TB, and an additional-information add box IB.

As an example, the signpost color box CB may specify the color of the end point EP of the additional-information signpost. When the user clicks the color to specify, the color of the end point EP of the additional-information signpost may be changed to the color specified by the user. In this case, the signpost color box CB may comprise a number of colors (e.g., red, yellow, green, sky blue, blue, purple, etc.), and the colors included in the signpost color box CB are modified and arranged in various ways.

The text input box TB may receive the title and description of the additional-information signpost. When the user inputs a title and a description, the title and description inputted may be inserted into the additional-information signpost and displayed in a separate message window on one side of the additional-information signpost.

The additional-information add box IB may specify various types of additional information to be added. For example, the user may further specify photos, videos, URL links, etc. via the additional-information add box IB.

In other words, the user may add specific additional information to the additional-information signpost and display it, via the pop-up SB for setting additional information.

As a result, the system for displaying additional information on a 3D tour in accordance with the described technology can allow the user to set the additional-information signpost at a desired location, and may display various additional information intended by the user.

Figure 6:
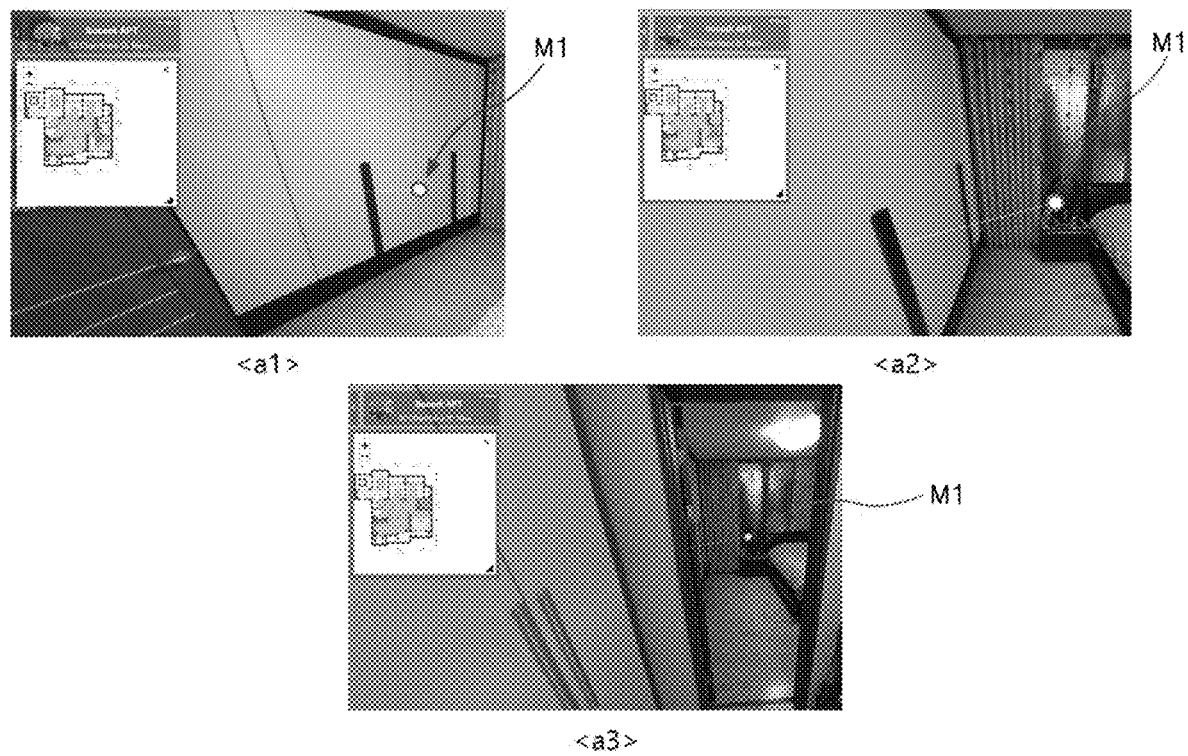
FIG. 6 is a view for illustrating an example in which additional information added to a 3D tour is expressed in a system for displaying additional information on a 3D tour in accordance with an embodiment of the described technology.

FIG. 6 is a view for illustrating an example in which additional information added to a 3D tour is expressed in a system for displaying additional information on a 3D tour in accordance with an embodiment of the described technology.

Referring to FIG. 6, an additional-information signpost set by a user may be checked at various locations in a 3D tour.

For example, <a1> shows the additional-information signpost viewed from a first point, <a2> shows the additional-information signpost viewed from a second point, and <a3> shows the additional-information signpost viewed from a third point. Here, the first to third points represent different image photographing points.

Referring to <a1>, <a2>, and <a3>, the user can check the location and description of the additional-information signpost previously inputted at several locations in the 3D tour, and the shape of the additional-information signpost may be displayed differently depending on the angle.

That is, the additional-information signpost may be set in 3D coordinates in a 360-degree image specified by the user and displayed in a 3D form. Accordingly, the additional-information signpost may be displayed, with its size and angle changed according to the location and field of view of the user.

Hereinafter, a method of setting an image for allowing an additional-information signpost of a server to be checked will be described in detail.

Figure 7:
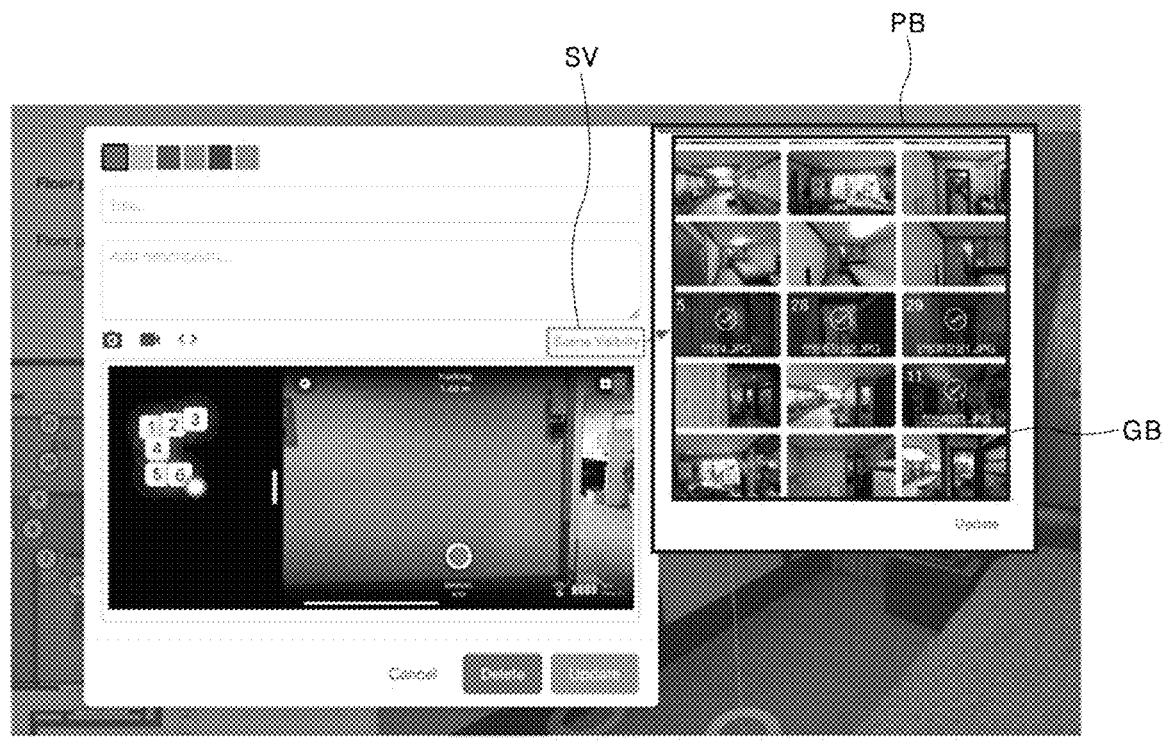
FIG. 7 is a view for illustrating a function of displaying added additional information only at particular image photographing points in a system for displaying additional information on a 3D tour in accordance with an embodiment of the described technology.

FIG. 7 is a view for illustrating a function of displaying added additional information only at particular image photographing points in a system for displaying additional information on a 3D tour in accordance with an embodiment of the described technology.

Referring to FIG. 7, a user may input various pieces of additional information via the interface for setting additional information described with reference to FIG. 5. As an example, the user may select a 360-degree image in which an inputted additional-information signpost is to be displayed out of a plurality of image photographing points included in a 3D tour by the interface for setting additional information.

As an example, if the user selects an image selection button SV provided in the interface for setting additional information, a pop-up window PB in which a plurality of 360-degree images included in the 3D tour are arranged is opened.

The plurality of 360-degree images included in the 3D tour may be displayed on a graphic box GB provided in the pop-up window PB. The user may select a particular 360-degree image on which a selected additional-information signpost is to be displayed, out of the plurality of 360-degree images shown in the graphic box GB. As a result, the user can set the additional-information signpost to be displayed only at a particular image photographing point. Thereafter, the additional-information signpost in question can represent various intentions of the user by being displayed only at the selected image photographing points.

As a result, the system for displaying additional information on a 3D tour in accordance with the described technology makes it possible to check additional information at various locations in a 3D tour, thereby improving the convenience for users, by selecting a particular 360-degree image on which a 3D additional-information signpost is intended to be displayed and by displaying the corresponding 3D additional-information signpost only on a particular image. As an example, the described technology can clearly convey the user's intention to display the additional information FIG. 8 is a view for illustrating another example in which additional information added to a 3D tour is expressed in a system for displaying additional information on a 3D tour in accordance with an embodiment of the described technology.

Figure 8:
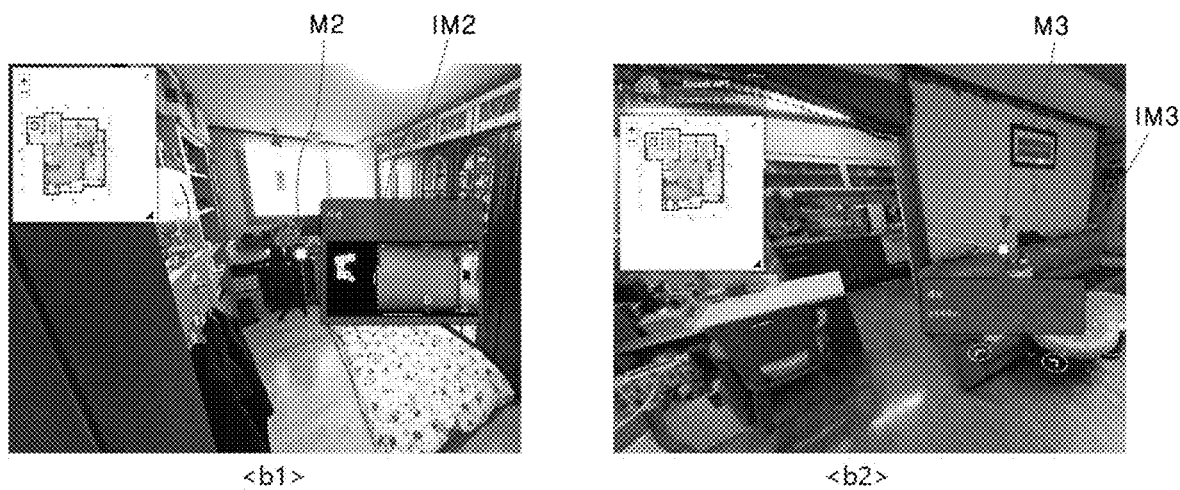
FIG. 8 is a view for illustrating another example in which additional information added to a 3D tour is expressed in a system for displaying additional information on a 3D tour in accordance with an embodiment of the described technology.

Referring to FIG. 8, if a user inputs only one point on the 3D tour, the system for displaying additional information on a 3D tour may set the inputted point as an end point, and set a point on a floor or wall surface located at the shortest distance from the inputted point as a start point, thereby creating an additional-information signpost.

For example, referring to <b1>, the additional-information signpost created by the input of one point may be set in a direction extending upward from the floor surface. In other words, the additional-information signpost may be formed to extend vertically from the floor surface. At this time, the floor surface may be set as the start point of the additional-information signpost by default or may be located closer to the inputted point than surrounding wall surfaces.

The user may enter the interface for setting additional information and input specific additional information, by selecting the additional-information signpost created.

After completing the input of the additional information, if another user clicks that additional-information signpost M2, an additional-information window IM2 (e.g., a photo) set by the one who inputted the additional information may be displayed on one side of the additional-information signpost.

As another example, referring to <b2>, an additional-information signpost in a 3D form may be set in a direction extending in a perpendicular direction from a wall surface. That is, the additional-information signpost may be formed to extend horizontally from the wall surface. At this time, the wall surface may be set as the start point of the additional-information signpost by default or may be located closer to the inputted point than the surrounding floor surface.

The user may enter the interface for setting additional information and input specific additional information, by selecting the additional-information signpost created.

After completing the input of the additional information, if another user clicks that additional-information signpost M3, an additional-information window IM3 (e.g., a note) set by the one who inputted the additional information may be displayed on one side of the additional-information signpost.

As an example, <b1> and <b2> may fall within preset basic shapes of the additional-information signpost. If the user inputs additional information onto a floor plan, the additional-information signpost may be represented by <b1> or <b2> depending on the proximity to the floor or wall surface.

Hereinafter, a method of displaying additional information on a floor plan in a system for displaying additional information on a 3D tour will be described.

Figure 9:
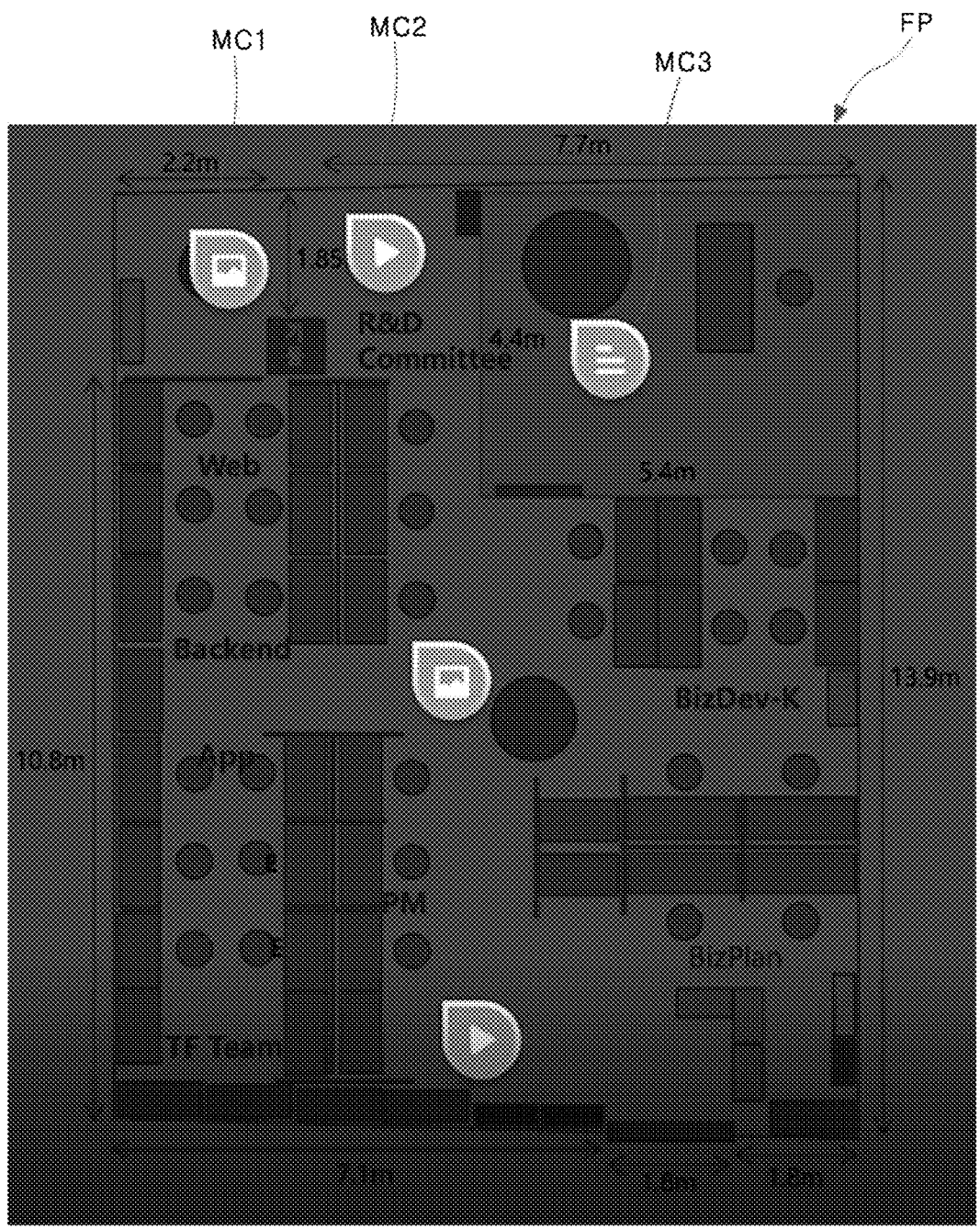
FIG. 9 is a diagram illustrating a floor plan on which icons for added additional information are displayed in a system for displaying additional information on a 3D tour in accordance with an embodiment of the described technology.

FIG. 9 is a diagram illustrating a floor plan on which icons for added additional information are displayed in a system for displaying additional information on a 3D tour in accordance with an embodiment of the described technology.

Referring to FIG. 9, icons for additional-information signposts set by a user may be displayed on a floor plan FP included in a 3D tour.

If the user sets the additional-information signposts in the 3D tour, a server 100 may convert the 3D coordinates into 2D coordinates.

The server 100 may display icons (e.g., photo icons, video icons, text icons) according to the type of additional information at the points (e.g., MC1, MC2, MC3) on the floor plan FP corresponding to the locations where the additional-information signposts are set in the 3D tour. The user can check the previously inputted additional information on the floor plan FP by clicking corresponding icons.

If the user sets the additional information in the floor plan FP, additional-information signposts may be created on the 3D tour so as to correspond to the locations where the additional information was set in the floor plan FP.

The additional information added in the floor plan FP may be formed as a corresponding additional-information signpost in the 3D tour. In this case, the start point SP and the end point EP of the additional-information signpost may be automatically set. The additional-information signpost may be created using a particular planar surface (e.g., a wall, a floor, etc.) at a distance closest to the location set in the floor plan FP as a start point SP. As an example, the end point EP of the additional-information signpost may be perpendicular to the particular planar surface and may be set to a predetermined height so as to have the shortest distance from the start point SP.

In this case, the additional-information signposts created may be formed in the form of <b1> or <b2> depending on the proximity to the floor or wall surface, as described above with reference to FIG. 8.

In summary, the system for displaying additional information on a 3D tour in accordance with the described technology can improve the convenience for users by automatically creating an additional-information signpost, which corresponds to the location where the additional information is displayed on the floor plan in the 3D tour, in the 3D tour.

Figure 10:
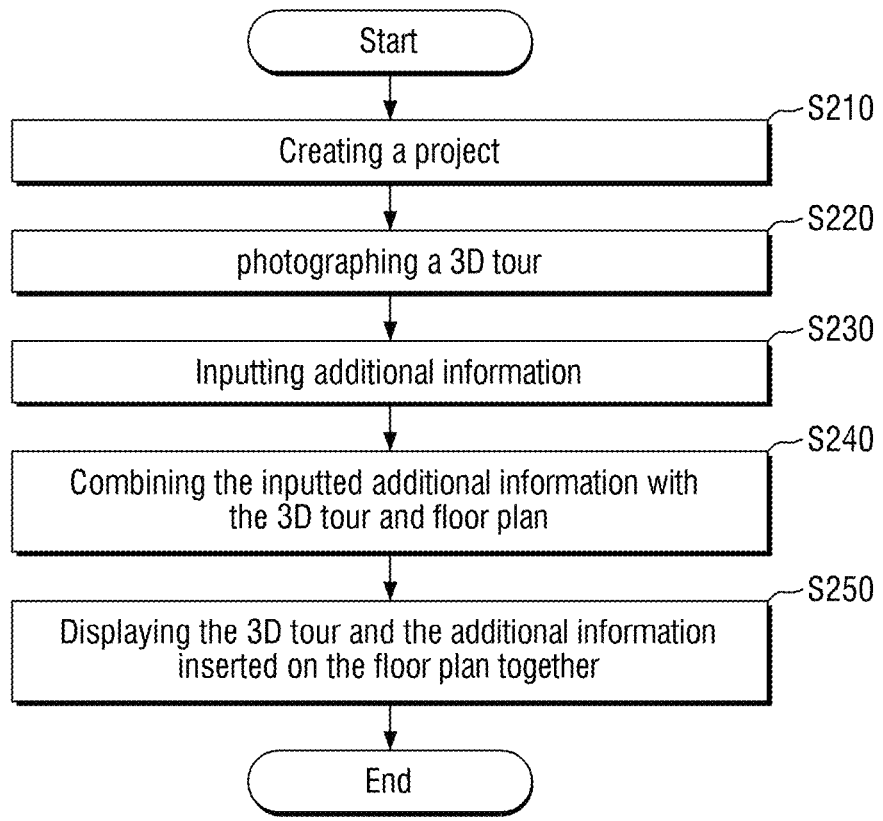
FIG. 10 is a flowchart for illustrating a method for displaying additional information on a 3D tour in accordance with another embodiment of the described technology.

FIG. 10 is a flowchart for illustrating a method for displaying additional information on a 3D tour in accordance with another embodiment of the described technology.

Referring to FIG. 10, in the method for displaying additional information on a 3D tour in accordance with an embodiment of the described technology, a server 100 first creates a project (S210). Within the created project, a user may perform a task of photographing a 3D tour and a task of inserting additional information onto a floor plan.

In this case, the task of photographing a 3D tour and the task of inserting additional information onto a floor plan may be performed sequentially by one user within the same project, or may be performed simultaneously by two or more users.

For example, the task of photographing a 3D tour may be performed by a first user, and the task of inserting additional information may be performed by a second user different from the first user. The task of photographing a 3D tour and the task of inserting additional information performed by different users may be combined within the same project after the completion of the tasks.

The server 100 photographs a 3D tour (S220). The 3D tour management server 100 receives a photographed image for configuring a 3D tour for a particular space from the user device 200. At this time, a 3D tour photographing screen for a particular space and a floor plan of the particular space may be displayed on a split-screen at the same time. As the 3D tour photographing screen and the floor plan screen are displayed on the split-screen, the user may insert various types of additional information onto the floor plan at the same time as the photographing of the 3D tour.

As an example, the server 100 provides the user device 200 with an interface having a button for adding additional information into the photographing screen or floor plan. If the user touches this button, the user device 200 may be provided with an interface for inserting additional information. In other words, the user may enter the stage of inserting additional information through a button click or a touch input for inserting the additional information.

When the user specifies a location on the floor plan, the server 100 inserts additional information at the selected location (S230). At this time, the user may specify the location for inserting the additional information through a click or touch operation on the floor plan.

When the location for inserting the additional information is specified, the server 100 displays the interface for inserting additional information on the screen. The user may input various types of additional information (e.g., notes, photos, etc.) via the interface for inserting additional information. The 3D tour management server 100 may receive the additional information inputted by the user via the interface for inserting additional information.

The server 100 combines the inputted additional information with the 3D tour and floor plan (S240). At this time, the server 100 may extract the two-dimensional (2D) location coordinates of the additional information inserted in the floor plan through tracking. Thereafter, by converting the extracted 2D coordinates into 3D coordinates, the location of an additional-information signpost to be displayed in the 3D tour may be automatically set.

The server 100 displays the 3D tour and the additional information inputted on the floor plan together (S250). At this time, the server 100 may display the additional information inserted in the 3D tour, in the 3D tour as an additional-information signpost in a 3D form.

Hereinafter, a method of photographing and tagging additional information of an interface for tagging additional information in the server will be described in detail.

Figure 11:
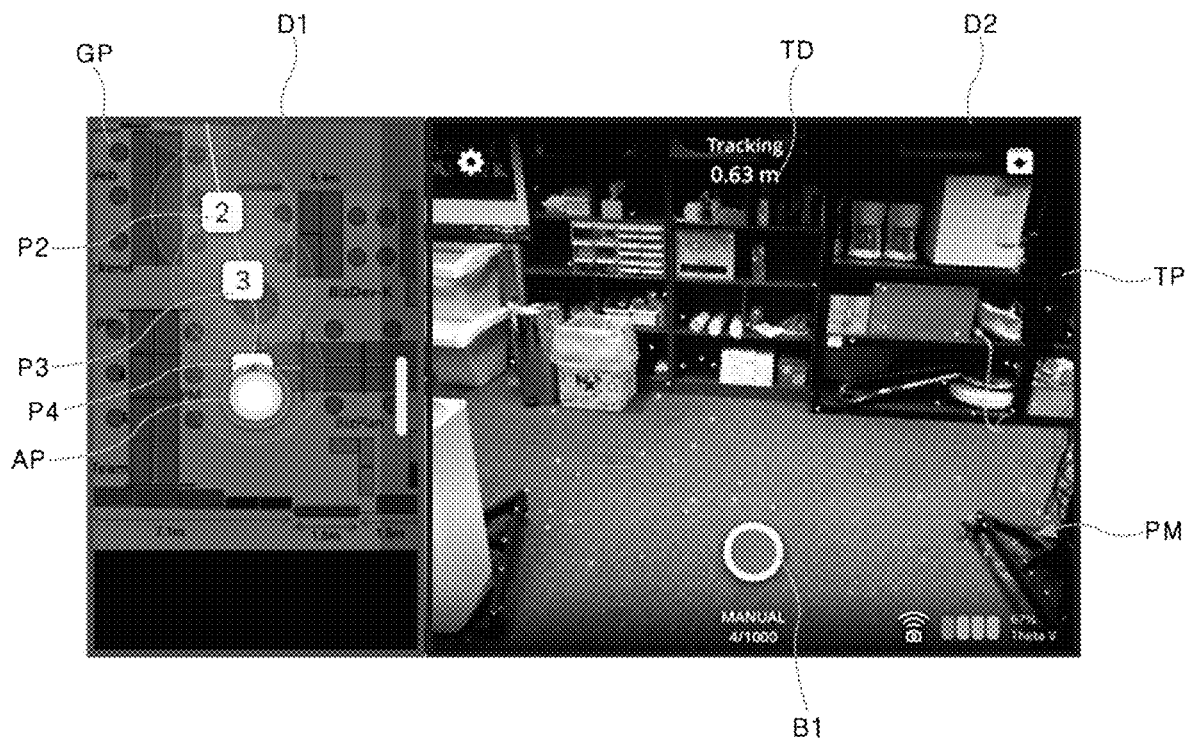
FIG. 11 is a view for illustrating a method of photographing a space in a system for displaying additional information on a 3D tour in accordance with another embodiment of the described technology.

FIG. 11 is a view for illustrating a method of photographing a space in a system for displaying additional information on a 3D tour in accordance with another embodiment of the described technology.

Referring to FIG. 11, the server 100 may perform a task of photographing a 3D tour of a space and a task of inserting additional information onto a floor plan, together within the same project.

The server 100 may provide a floor plan GP on a first screen D1 and a process of photographing a 3D tour of a space on a second screen D2, via a split-screen.

At this time, the user can check his/her current location via a location setting point AP on the floor plan GP in the first screen D1.

Further, the user may photograph a space via the second screen D2. The user can start photographing for creating a 3D tour by selecting a record button B1 provided at the bottom of a 3D tour photographing screen TP of the second screen D2.

As an example, if the user selects the record button B1, a 360-degree camera module (not shown) connected to the server 100 may perform a photographing operation at 360-degree in that location to create a 3D tour. At this time, the 360-degree camera module (not shown) may consecutively create 360-degree images at a constant spatial distance or time interval. Thereafter, the server 100 may create a 3D tour by mapping a plurality of captured 360-degree images to a movement path. However, this is just one example, and a method of creating a 3D tour by a 360-degree camera module (not shown) during the 3D photographing may be modified and implemented in various ways.

The 360-degree images created by the 360-degree camera module (not shown) may be temporarily stored in the 360-degree camera module (not shown), and may be transmitted to the server 100 when the user ends photographing. For example, the user may end photographing by selecting the record button B1 once again in the photographing state. If the photographing is ended, the 360-degree images stored in the 360-degree camera module (not shown) may be transmitted to the server 100.

As an example, the server 100 may extract a movement path of the user through a tracking technique. As can be seen by observing the photographing process of the 3D tour in the second screen D2, a plurality of feature points PM may be displayed in the 3D tour photographing screen TP.

After extracting the plurality of feature points PM, the server 100 may calculate the moving direction and distance of the feature points PM according to changes in the images captured by the user. The server 100 may calculate a movement path of the user device 200 using the extracted information. The movement path calculated may be displayed on the floor plan GP in the first screen D1.

For example, the server 100 may set the location of a 3D tour captured by the user for the second time as a second photographing point P2, the location of a 3D tour captured for the third time as a third photographic point P3, and the location of a 3D tour captured for the fourth time as a fourth photographic point P4, via the feature points PM.

The server 100 may display the second photographing point P2, the third photographing point P3, and the fourth photographing point P4 on the floor plan GP, and represent the movement path of the user device 200 by a line. At this time, the server 100 may extract the photographing ranges of the first photographing point, the second photographing point, the third photographing point, and the fourth photographing point, and display them on the floor plan GP.

Additionally, a 3D tour photographing distance TD may be displayed on the 3D tour photographing screen TP in the second screen D2. Here, the 3D tour photographing distance TD may represent the movement distance of the user device 200 extracted via the feature points PM.

The user may switch the screen to the interface for inserting additional information by selecting a particular point in the floor plan in the first screen D1 when additional information to be inserted occurs while photographing 3D tours. Details of the interface for inserting additional information will be described in detail with reference to FIGS. 12 and 13. Further, details of a tracking system will be described in detail with reference to FIGS. 16 and 17.

Hereinafter, a method of inserting additional information via the interface for inserting additional information provided by the server will be described in detail.

Figure 12:
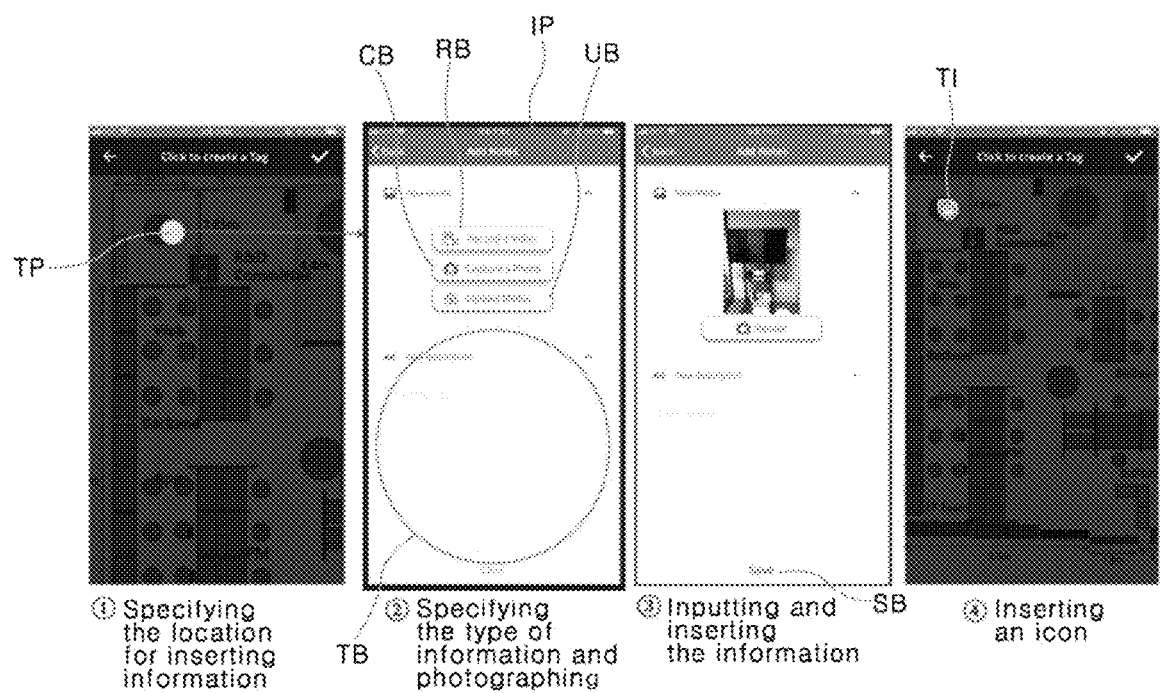
FIG. 12 is a view for illustrating an example of an interface for inserting additional information in accordance with another embodiment of the described technology.

FIG. 12 is a view for illustrating an example of an interface for inserting additional information in accordance with another embodiment of the described technology.

Referring to FIG. 12, a user may select a particular point TP on a floor plan displayed on the screen. Here, the particular point TP represents a location to which additional information is to be added.

The server 100 displays an interface IP for inserting additional information on the screen of a user device 200.

Thereafter, the user may specify the type of additional information (e.g., photos, videos, texts, etc.) via the interface IP for inserting additional information.

For example, the interface IP for inserting additional information may comprise a video record button RB, an image capture button CB, and a media upload button UB.

If the user selects the video record button RB, the interface IP for inserting additional information may be switched to a video record mode, and videos captured through this may be inserted into the floor plan as additional information.

Also, the user may select the image capture button CB to capture an image, and may insert the captured image into the floor plan as additional information. Further, the user may select the media upload button UB, and may insert various types of additional information stored in and inputted to, a device including the user device 200, an Internet server (not shown), and the like, into the floor plan. Moreover, the user may insert a relevant note as additional information onto the floor plan by inputting texts into a text input box TB included in the interface IP for inserting additional information.

The user may select an insert button SB to complete the insertion of the additional information. The additional information inserted may be displayed on the floor plan in the form of an icon TI. Here, the shape of the icon TI may be displayed differently according to the type of additional information.

The interface IP for inserting additional information illustrated in the drawings is only one example, and an interface for inputting additional information may be modified and implemented in various ways.

As a result, the server of the described technology enables the 3D tour photographing and the insertion of additional information into the floor plan at the same time. Accordingly, the described technology can resolve the inconvenience of a user having to separately input related additional information after a 3D tour photographing.

Figure 13:
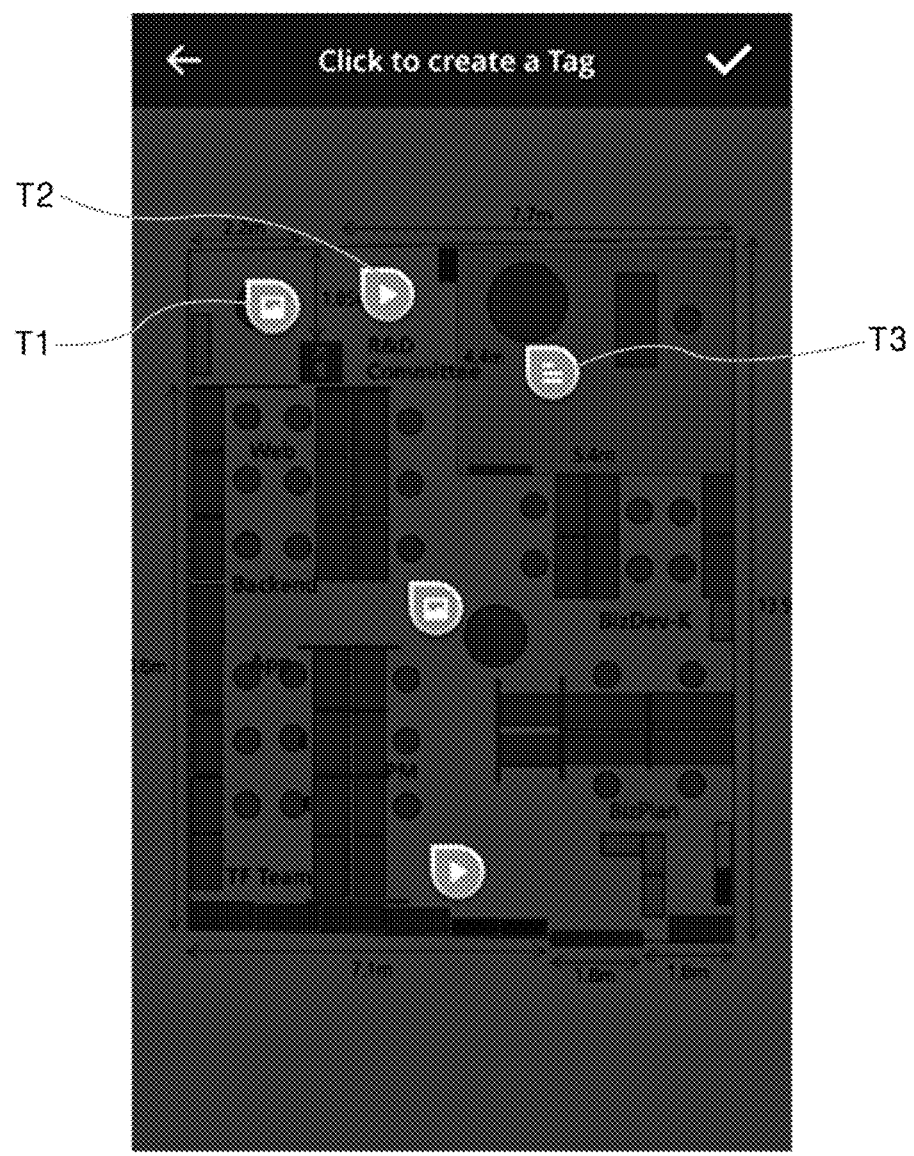
FIG. 13 is a diagram illustrating a floor plan on which icons of additional information inserted via the interface for inserting additional information of FIG. 12 are displayed.

FIG. 13 is a diagram illustrating a floor plan on which icons of additional information inserted via the interface for inserting additional information of FIG. 12 are displayed.

Referring to FIG. 13, the server 100 may display icons of additional information inserted by a user on a floor plan. The user may store a lot of additional information in the floor plan by specifying desired locations in the floor plan and inserting various types of additional information (e.g., photos, videos, notes, etc.). Icons indicating the locations of the additional information inserted may be displayed on the floor plan.

At this time, the shapes of the icons displayed on the floor plan may be in various forms depending on the types of information. For example, if the user captures an image or inserts a stored image via the interface IP for inserting additional information, a photo icon T1 may be displayed on the floor plan. Further, if the user inserts additional information in the form of a video, a video icon T2 may be displayed on the floor plan, and in the case of inserting additional information in the form of a text, a text icon T3 may be displayed.

However, the described technology is not limited thereto, additional-information icons may be displayed in various shapes and images, and the described technology may comprise various modifications, such as directly specifying or creating the shapes of icons by a user, and the like.

The method for displaying additional information on a 3D tour in accordance with the described technology can allow a user to grasp locations of inserted additional information at a glance by displaying the locations of the inserted additional information on a floor plan in a 3D tour as icons.

Figure 14:
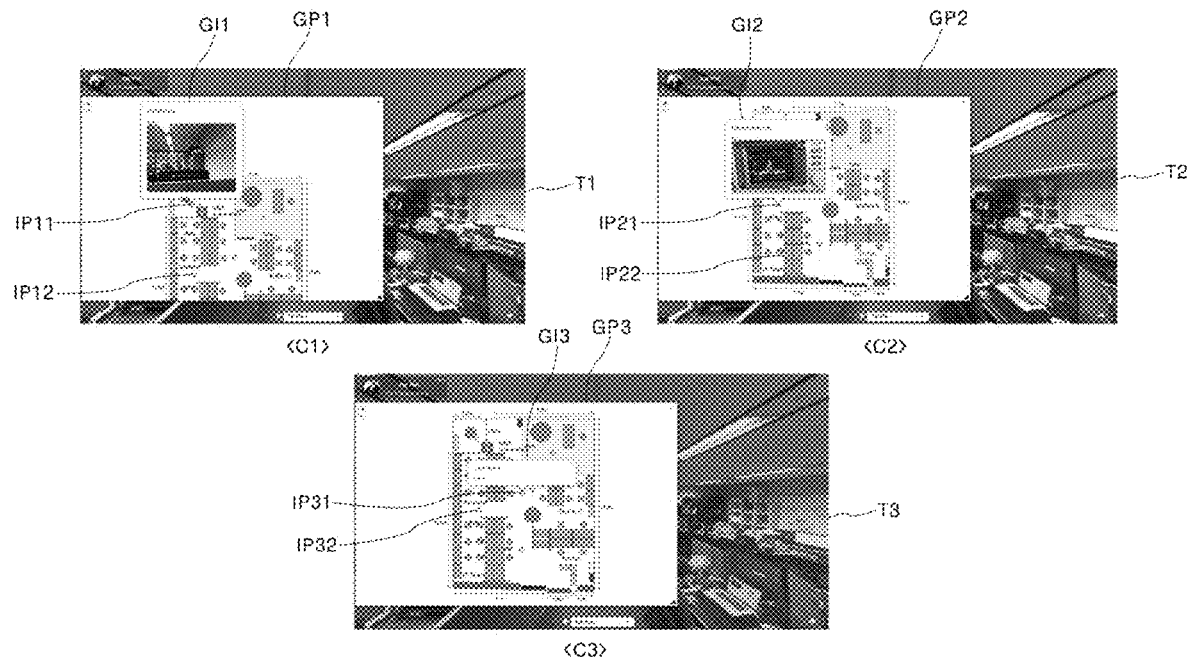
FIGS. 14 and 15 are views for illustrating expressing additional information by combining a floor plan and a 3D tour in a system for displaying additional information on a 3D tour in accordance with another embodiment of the described technology.
Figure 15:
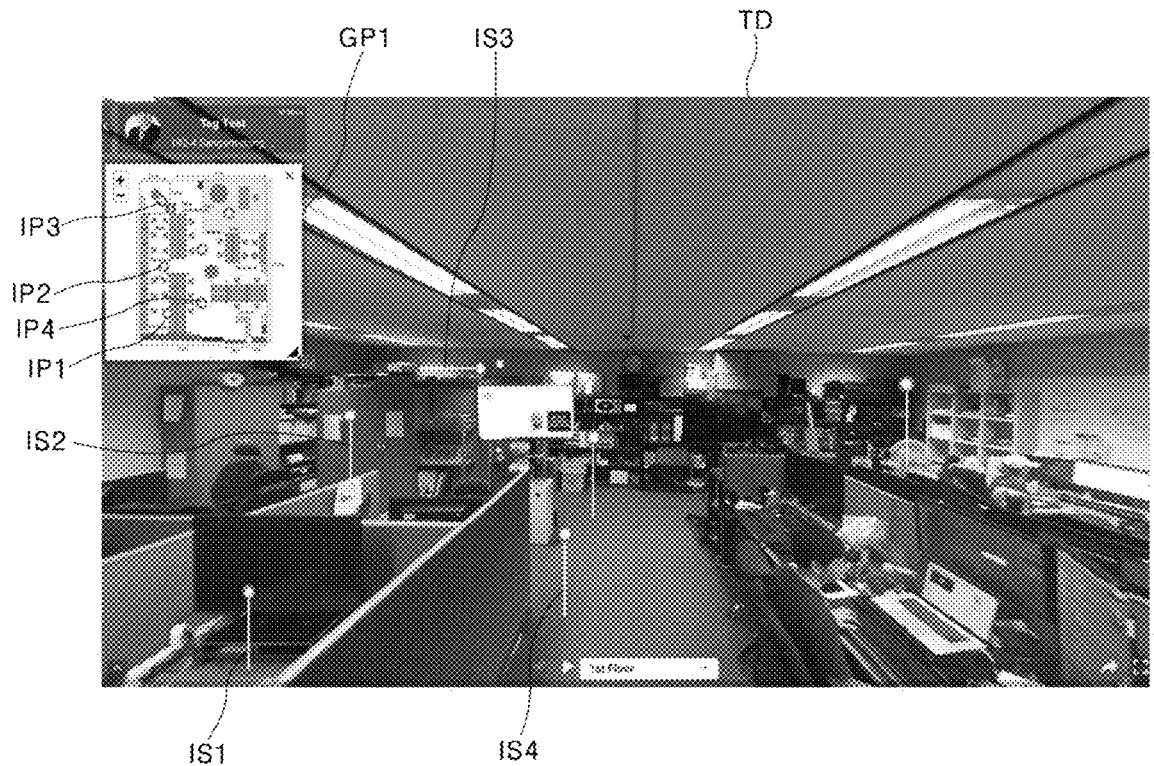

FIGS. 14 and 15 are views for illustrating expressing additional information by combining a floor plan and a 3D tour in a system for displaying additional information on a 3D tour in accordance with another embodiment of the described technology.

The server 100 may combine additional information with a 3D tour, thereby expressing the additional information inserted into a floor plan together in the 3D tour. The user may check the contents of the additional information set by the user on the floor plan in the 3D tour.

Referring to FIG. 14, the server 100 may express the contents of various types of additional information in the floor plan. Further, the server 100 may display locations of the additional information inserted by the user on the floor plan of the 3D tour.

For example, referring to <c1>, a plurality of additional-information icons, such as a first additional-information icon IP11 and a second additional-information icon IP12, may be displayed on a first floor-plan GP1 of a first tour T1 at the locations where each additional information was inserted. If the user selects the first additional-information icon IP11 on the first floor-plan GP1, an additional-information display window GI1 including an additional-information image may be displayed.

Referring to <c2>, a plurality of additional-information icons, such as a third additional-information icon IP21 and a fourth additional-information icon IP22, may be displayed on a second floor-plan GP2 of a second tour T2 at the locations where the user has inserted the additional information. If the user selects the third additional-information icon IP21 on the second floor-plan GP2, an additional-information display window GI2 including a video inserted as additional information may be displayed.

Referring to <c3>, several additional-information icons, including a fifth additional-information icon IP31 and a sixth additional-information icon IP32, may be displayed on a third floor-plan GP3 of a third tour T3. If the user selects the fifth additional-information icon IP31 on the third floor-plan GP3, an additional-information display window GI3 including the text inserted by the user may be displayed.

Referring to FIG. 15, the server 100 may display the additional information inserted into a floor plan in the form of an additional-information signpost within a 3D tour.

In this case, the server 100 may extract the location of the additional information inserted into the floor plan via tracking, and then create and insert an additional-information signpost at a location corresponding thereto.

As an example, the server 100 may extract a plurality of feature points from an image captured during a 3D tour photographing process. Thereafter, the server 100 may calculate the moving direction and distance of the feature points according to changes in the photographed image through the feature points, and based on this, may extract the location coordinate of the additional information. At this time, the location coordinate of the extracted additional information may consist of 2D coordinates.

The server 100 may convert the 2D coordinates of the extracted additional information into 3D coordinates on the 3D tour.

Thereafter, the server 100 may map the additional information inputted on the 3D tour by using the converted 3D coordinates.

The server 100 may display a 3D additional-information signpost at the mapped location in the 3D tour.

In this case, the start point of the 3D additional-information signpost may be located on an adjacent planar surface (e.g., a floor surface or a wall surface). Further, the end point of the additional-information signpost may be set at a predetermined height from the start point. The 3D additional-information signpost may be displayed in the 3D tour in the form of a straight line connecting the start point and the end point. However, the described technology is not limited thereto, and the shape of the additional-information signpost may comprise various modifications such as curves and circles.

For example, a plurality of additional-information icons, including a first additional-information icon IP1, a second additional-information icon IP2, a third additional-information icon IP3, and a fourth additional-information icon IP4, may be displayed on a floor plan GP1 in a 3D tour screen TD.

Thereafter, the server 100 may extract the location coordinates of the additional information in the floor plan through the extraction of feature points, and may convert the extracted 2D coordinates into 3D coordinates, to thereby select locations for inserting additional information in the 3D tour.

The server 100 may create and display additional-information signposts corresponding to the additional information inserted in the 3D tour.

At this time, the additional-information signposts on the 3D tour screen TD may correspond to the locations of the additional-information icons on the floor plan, respectively.

For example, in the case of the first additional-information signpost IS1, a desk surface, which is a planar surface closest to a selected location, may be set as a start point. As an example, the point corresponding to the first additional-information icon IP1 may be set as an end point, and the additional-information signpost may be displayed by connecting the start point and the end point.

Moreover, for the second additional-information signpost IS2, the top surface of a partition wall, which is a planar surface closest to the location where the second additional-information signpost IS2 is selected, may be displayed as a start point. Further, the second additional-information signpost IS2 may be set by setting the point corresponding to the location coordinate of the second additional-information icon IS2 as an end point and by connecting the start point and the end point.

As an example, for the third additional-information signpost IS3, a side face of a box on the bookshelf, which is a planar surface closest to the location of the third additional-information icon IS3 on the floor plan GP1, may be set as a start point. Thereafter, the third additional-information signpost IS3 may be displayed by setting the point corresponding to the location coordinate of the third additional-information icon IS3 as an end point and by connecting the start point and the end point.

Further, for the fourth additional-information signpost IS4, a floor surface that is a planar surface closest to a selected location may be displayed as a start point. The fourth additional-information signpost IS4 may be displayed by displaying the point corresponding to the location coordinate of the fourth additional-information icon IP4 as an end point and by connecting the start point and the end point.

Hereinafter, a tracking method for extracting the location coordinates of additional information performed by the server will be described in detail.

Figure 16:
FIGS. 16 and 17 are views for illustrating a tracking method performed by a system for displaying additional information on a 3D tour in accordance with another embodiment of the described technology.
Figure 17:
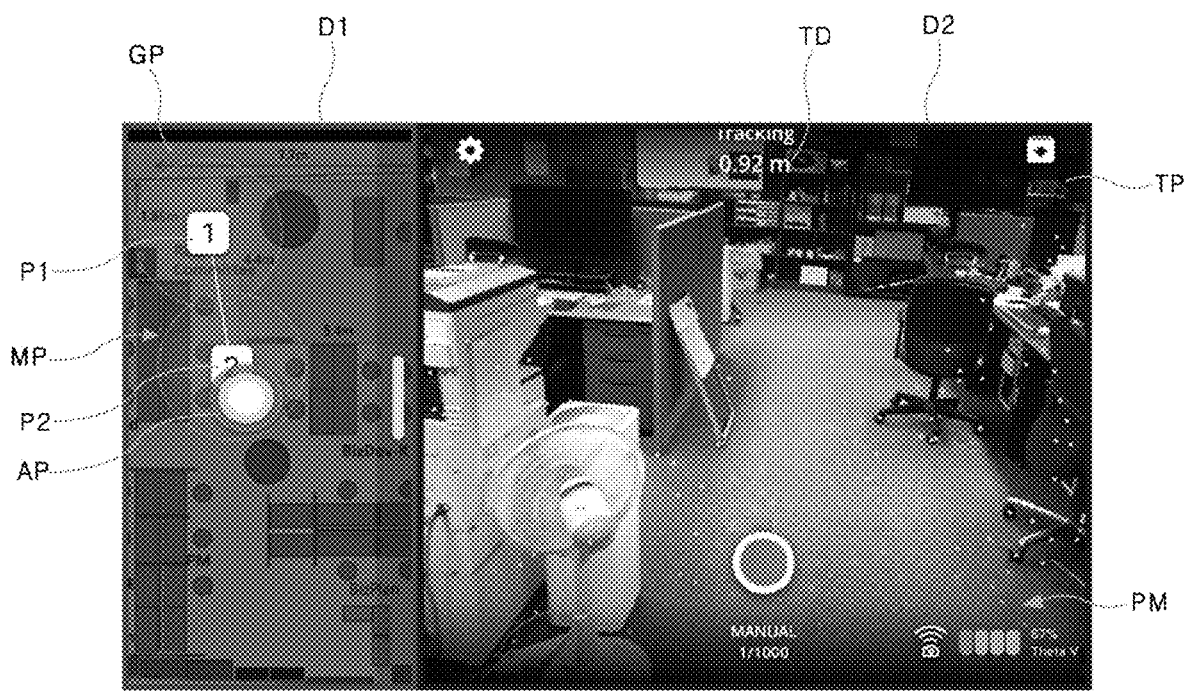

FIGS. 16 and 17 are views for illustrating a tracking method performed by a system for displaying additional information on a 3D tour in accordance with another embodiment of the described technology.

Referring to FIG. 9, the server 100 may extract the location coordinates of additional information in a floor plan by using a tracking function. Here, the tracking function is a function of extracting the movement of a user device 200 when a user records a video.

If the tracking function is performed, feature points PM may be extracted from a video being recorded while the video is being recorded.

Thereafter, the server 100 may calculate the moving direction and distance of the feature points PM according to changes in the photographed image through the extracted feature points PM. As a result, the server 100 may calculate the location change and direction change of the additional information. Furthermore, the server 100 may calculate a movement distance TD and display it in a 3D tour photographing screen.

The server 100 may calculate current location coordinates by referring to the information of the extracted location change.

The server 100 may use the calculated location coordinates to display the additional information inserted onto the floor plan, at a corresponding location in the 3D tour in the form of a 3D additional-information signpost.

Referring to FIG. 10, the server 100 may split the screen of the user device 200, and display a floor plan GP on one side of the split-screen and a 3D photographing screen TP on the other side of the split-screen.

As an example, the floor plan GP may be provided in a first area D1 of the user device 200, and the 3D photographing screen TP capable of photographing a 3D tour of a particular space may be provided in a second area D2. In this case, the floor plan GP may correspond to a floor plan for a particular space in which the 3D tour is photographed.

If the user photographs through the second area D2, feature points PM may be extracted from an image being captured. The server 100 may extract the current location coordinates of the user device 200 by using the extracted feature points PM.

Once the current location coordinates of the user device 200 are extracted, the server 100 may display the location AP of the user device 200, which is currently photographing, on the floor plan GP of the first screen D1. Further, a first photographing point P1 and a second photographing point P2 may be displayed on the floor plan GP by using the location coordinates at the time of photographing, and the moving direction may be indicated by connecting a plurality of photographing points. Also, a movement path MP along which the user device 200 has moved may be displayed on the floor plan GP.

As a result, the system for displaying additional information on a 3D tour in accordance with the described technology can allow the additional information inserted by the user to be displayed in both the floor plan and the 3D tour by automatically displaying the additional information inserted onto the floor plan at a corresponding location in the 3D tour in the form of an additional-information signpost, thereby improving the convenience for the user.

As described above, although the described technology has been described with limited embodiments and drawings, the described technology is not limited to the embodiments above, and can be modified and changed in various ways from such a description by those of ordinary skill in the art to which the described technology pertains. Therefore, the spirit of the described technology should be grasped only by the claims set forth below, and all equal or equivalent variations thereof are intended to fall within the scope of the spirit of the inventive concept.

What is claimed is:

1. A method for displaying additional information on a 3D tour performed by a server for displaying additional information on a 3D tour operating in conjunction with a user device, the method comprising:

providing a 3D tour comprising 3D information of a particular space to the user device;

receiving coordinate information for at least one particular point selected by a user within the 3D tour;

setting a start point and an end point of an additional-information signpost by using the coordinate information;

in response that the at least one particular point selected by the user only includes a first particular point, setting the first particular point as the end point and setting a point on an adjacent plane surface located at the shortest distance from the end point as the start point; and creating the additional-information signpost within a space of the 3D tour, based on the set start point and end point.

2. The method for displaying additional information on a 3D tour of claim 1, further comprising:

overlappingly displaying the created additional-information signpost on the 3D tour.

3. The method for displaying additional information on a 3D tour of claim 1, wherein in response that the at least one particular point selected by the user further comprises a second particular point different from the first particular point, setting the first particular point as the start point and setting the second particular point as the end point.

4. The method for displaying additional information on a 3D tour of claim 1, wherein the adjacent plane surface is a floor surface.

5. The method for displaying additional information on a 3D tour of claim 1, wherein the adjacent plane surface is a wall surface.

6. The method for displaying additional information on a 3D tour of claim 1, wherein the additional-information signpost is set as three-dimensional coordinates on the 3D tour and displayed in 3D form.

7. The method for displaying additional information on a 3D tour of claim 1, wherein the 3D tour comprises a floor plan of the particular space, the method further comprising:

converting the three-dimensional coordinates of the created additional-information signpost into two-dimensional coordinates; and displaying an additional-information icon for the additional-information signpost, at a point on the floor plan corresponding to the two-dimensional coordinates.

8. The method for displaying additional information on a 3D tour of claim 1, further comprising:

providing an interface for setting additional information configured to set at least one photographing point on which the additional-information signpost is displayed out of a plurality of image photographing points included in the 3D tour.

9. The method for displaying additional information on a 3D tour of claim 1, further comprising:

providing the user device with an interface for setting additional information configured to set at least one of a color, title, description, or additional information of the additional-information signpost, wherein the additional-information signpost is created based on at least one of the color, title, description, or additional information inputted via the interface.

10. The method for displaying additional information on a 3D tour of claim 9, wherein the additional information is displayed on one side of the additional-information signpost.

11. The method for displaying additional information on a 3D tour of claim 9, wherein the additional information is displayed via a separate message window if the user selects the additional-information signpost.

12. The method for displaying additional information on a 3D tour of claim 9, wherein the additional information comprises at least one of a photo, a video, and a URL link.

13. A server for displaying additional information on a 3D tour, the server comprising:
- a processor; and
- a memory having stored thereon a program executed by the processor, the program comprising:
  - an operation of providing a 3D tour comprising 3D information of a particular space to the user device;
  - an operation of receiving coordinate information for at least one particular point selected by a user within the 3D tour;
  - an operation of setting a start point and an end point of an additional-information signpost by using the coordinate information;
  - an operation of, in response that the at least one particular point selected by the user only includes a first particular point, setting the first particular point as the end point and setting a point on an adjacent plane surface located at the shortest distance from the end point as the start point; and
  - an operation of creating the additional-information signpost within a space of the 3D tour, based on the set start point and end point.

14. The server for displaying additional information on a 3D tour of claim 13, wherein the program further comprises an operation of overlappingly displaying the created additional-information signpost on the 3D tour.

* * * * *